US010056099B1

(12) United States Patent
Nylander-Hill

(10) Patent No.: US 10,056,099 B1
(45) Date of Patent: Aug. 21, 2018

(54) VARIABLE RANGE OFFSET READ RECOVERY FOR TAPE STORAGE DEVICES

(71) Applicant: INTERNATIONAL BUSINESS MACHINES CORPORATION, Armonk, NY (US)

(72) Inventor: Pamela R. Nylander-Hill, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/437,561

(22) Filed: Feb. 21, 2017

(51) Int. Cl.
G11B 5/588 (2006.01)
(52) U.S. Cl.
CPC .................... G11B 5/588 (2013.01)
(58) Field of Classification Search
None
See application file for complete search history.

(56) References Cited

U.S. PATENT DOCUMENTS

| 6,700,728 | B2 | 3/2004 | Smith et al. | |
| 6,906,888 | B1 | 6/2005 | Trabert et al. | |
| 7,839,599 | B2* | 11/2010 | Bui | G11B 5/584 360/75 |
| 8,760,795 | B2* | 6/2014 | Cherubini | G11B 5/584 360/77.12 |
| 8,780,486 | B2 | 7/2014 | Bui et al. | |
| 8,941,940 | B1* | 1/2015 | Bayang | G11B 5/584 360/69 |
| 9,058,828 | B1 | 6/2015 | Cherubini et al. | |
| 9,190,112 | B1* | 11/2015 | Bayang | G11B 27/36 |
| 2011/0051286 | A1 | 3/2011 | Pokharel et al. | |
| 2017/0032817 | A1 | 2/2017 | Bui et al. | |

* cited by examiner

Primary Examiner — K. Wong
(74) Attorney, Agent, or Firm — Griffiths & Seaton PLLC

(57) ABSTRACT

Various embodiments for error recovery in a data storage environment, by a processor device, are provided. For monitoring signal from one or more read channels in a tape storage drive, a variable range of offsets organized by row into a table is selected by a microcode algorithm and applied by a track following servo mechanism of the tape storage drive to position a read head in relation to a track of a tape media at an offset up to and including beyond a predetermined margin of the track.

21 Claims, 12 Drawing Sheets

900

TRACK LAYOUT BY DATA FORMAT

|  | CARTRIDGE-DATA FORMATS | | | |
| --- | --- | --- | --- | --- |
|  | J5A-JD 15 TB | J5-JD 10 TB | J5-JC 7 TB | J4-JC 4 TB |
| TRACK PITCH | 1.35 um | 2.02 um | 2.25 um | 3.85 um |
| DATA TRACKS | 7680 | 5120 | 4608 | 2560 |
| WRAPS | 240 | 160 | 144 | 80 |
| CONCURRENT TRACKS | 32 | 32 | 32 | 32 |

950

OFFSET MARGINS BY DRIVE TYPE

| DRIVE TYPE | READER WIDTH | SUPPORTED DATA FORMAT MARGINS MARGIN=(TRACKPITCH - READERWIDTH) /2 | | | |
| --- | --- | --- | --- | --- | --- |
|  |  | J5A-JD | J5-JD | J5-JC | J4-JC |
| TS1155 | 1.00 um | 0.17 um | 1.10 um | 0.62 um | 1.42 um |
| TS1150 | 1.25 um | NO SUPPORT | 0.38 um | 0.50 um | 1.30 um |

| NOMINAL RANGE | DEFAULT (0%) | 40% | 55% | 70% | 85% |
| --- | --- | --- | --- | --- | --- |
| HIGH RANGE | DEFAULT (0%) | 90% | 105% | 110% | 135% |
| OFFTRACK WRITE RANGE | DEFAULT (0%) | 70% | 150% | 270% | 280% |

| ID | S/N | ID | S/N | ID | S/N | ID | S/N |
|---|---|---|---|---|---|---|---|
| 00 | = E0000579 | 08 | = E78D82FF | 16 | = E78D8498 | 24 | = ------------ |
| 01 | = E78D11BF | 09 | = E78D84AF | 17 | = E78DB803 | 25 | = ------------ |
| 02 | = E78DB82F | 10 | = E78D11EE | 18 | = ------------ | 26 | = ------------ |
| 03 | = E78DB819 | 11 | = E78DB824 | 19 | = ------------ | 27 | = ------------ |
| 04 | = E78D849E | 12 | = E78DB81B | 20 | = ------------ | 28 | = ------------ |
| 05 | = E78D11CD | 13 | = E78D84B4 | 21 | = ------------ | 29 | = ------------ |
| 06 | = E78D84B5 | 14 | = E78D84B8 | 22 | = ------------ | 30 | = ------------ |
| 07 | = E78D8314 | 15 | = E78D84AC | 23 | = ------------ | 31 | = ------------ |

FIRST S/N CHAR INDICATES DRIVE TYPE : D=JAG4, E=JAG5, G=JAG5A
DRIVE 00 IS THE NATIVE, OR LOADED, DRIVE

FIG. 12B

VARIABLE RANGE OFFSET READ RECOVERY FOR TAPE STORAGE DEVICES

BACKGROUND OF THE INVENTION

Field of the Invention

The present invention relates in general to computers, and more particularly to various embodiments for data error recovery in tape storage systems.

Description of the Related Art

In today's society, computer systems are commonplace. Computer systems may be found in the workplace, at home, or at school. Computer systems may include data storage systems, or disk storage systems, to process, store, and archive data. Large data archiving solutions typically use tape library systems where workstations and client devices are connected to one or more servers, and the servers are connected to one or more libraries. In data centers, such as those providing imaging for health care, entertainment, weather, military, and space exploration applications, these servers and libraries are often interconnected in a grid-computing environment. As wide strides in technological advancement relating to data access devices have been accomplished, there is an ever-growing demand for growth and development within the back end supporting systems that provide and store the data content.

SUMMARY OF THE DESCRIBED EMBODIMENTS

Various embodiments for error recovery in a data storage environment, by a processor device, are provided. In one embodiment, a method comprises, for monitoring signal from one or more read channels in a tape storage drive, selecting and applying a variable range of offsets organized by row into a table by a track following servo mechanism of the tape storage drive to position a read head in relation to the center position of a concurrent set of data tracks recorded simultaneously on a tape media at an offset up to and including beyond a predetermined margin of the track width above and below the center line of each track.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 9 illustrates a table diagram of data formats and offset margins, according to aspects of the present invention;

FIG. 10 illustrates a table diagram of variable offset ranges, according to aspects of the present invention;

FIGS. 12A-B illustrate a table diagram of a tape map and drive statistics, according to aspects of the present invention.

DETAILED DESCRIPTION OF THE DRAWINGS

Figure 1A:
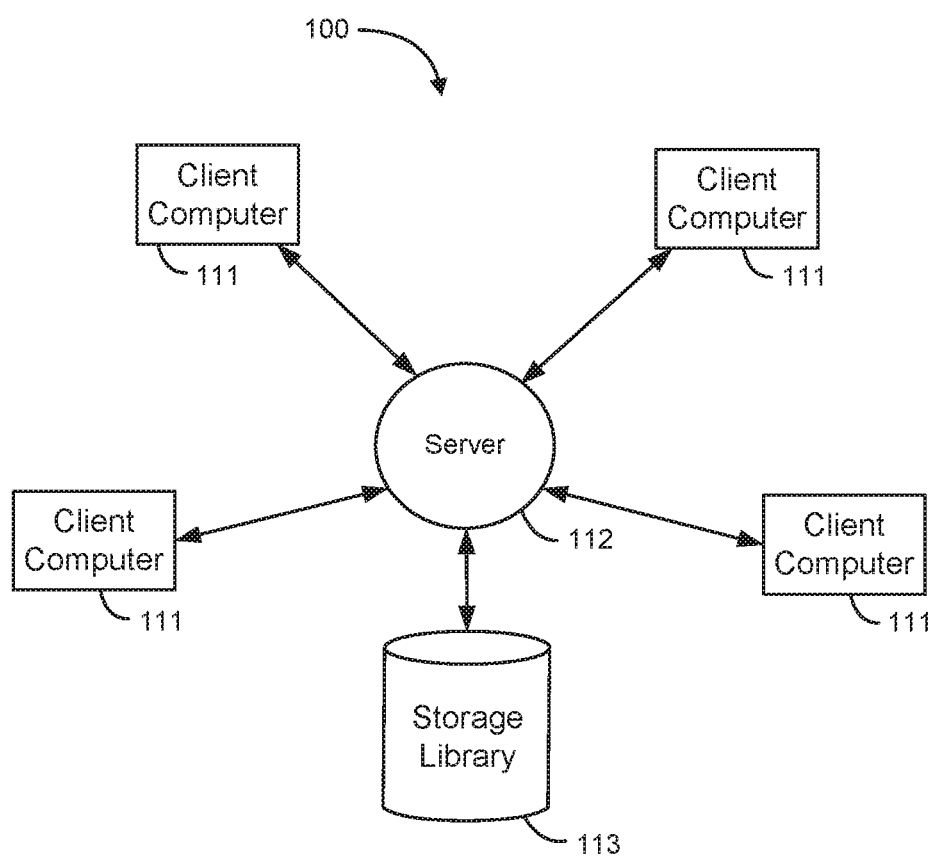
FIG. 1A is a block diagram illustrating a typical client-server library system for archiving data, in which aspects of the invention can be implemented.

With increasing demand for faster, more powerful and more efficient ways to store information, optimization of storage technologies is becoming a key challenge, particularly in tape drives. In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media. An important and continuing goal in the data storage industry is that of increasing the density of data stored on a medium. For tape storage systems, that goal has led to increasing the track and linear bit density on recording tape, and decreasing the thickness of the magnetic tape medium.

In a tape drive system, magnetic tape is moved over the surface of the tape head at high speed. Usually the tape path and guiding rollers are designed to minimize the spacing between the recording head and the tape as it moves in and out of the cartridge. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

These tape drive systems read and write data in a format native to the device type in which data is recorded longitudinally in a serpentine fashion along a length (or pass) of magnetic tape, parallel to the edges of the tape. The servo system indexes the head to a different vertical position at the end of each pass prior to reversing direction to read or write data in the opposite direction. As aforementioned, increasing densities lead to smaller track widths and more longitudinal passes (or wraps). Generally, a tape storage device supports downward compatibility in that it can both read and write the native format of one older generation (tape storage device n-1) and additionally can read the native format of two older generations (tape storage device n-2). This downward read compatibility of past generation data formats is referred to as "read interchange". In another context, "read interchange" can also refer to reading native format data that was written by another drive which may have a defect or be operating with off-specifications.

Since each generation of tape storage device reads and writes data at increasingly higher densities and narrower track width (or track pitch), read interchange inherently presents challenges. Servo control allows for constant velocity and tension as tape moves across the head between reels using guiding rollers. Additionally, the servo controls the accurate positioning of the head across written data tracks to enable optimum data channel signal processing which transmits the signal to data error correction code (ECC) logic in the dataflow. Host user data is protected by two orthogonal Reed-Solomon codes, called C1 and C2. Reed-Solomon is a mathematically computed code which yields check bytes used for the detection and correction of errors. These errors can occur in written data due to degraded media or other transmission defects when data is read from the tape.

The tape head, tape path, and media are all subject to wear and debris since, when in operation, there is continual head/tape contact. Wear affects servo tracking, magnetic field spacing, and signal amplitude. Wear can cause tape damage, and stain or debris to build up on the head, which leads to signal dropout. Additionally, environmental conditions (cartridge processing or cartridge storage) can cause stack errors which lead to tape damage or distortion. High temperatures increase pack tightness in the cartridge which can cause hardband tape distortion, wound-in debris affecting the magnetic layer, or tape layers adhering to each other. High humidity can also cause the tape to stick to the head (stiction, tape slip).

When data cannot be read from tape without error, microcode algorithms are initiated for data recovery. Data recovery normally involves a sequence of retries which backhitch and reposition the head to reread data from media. Each retry can change the read speed, and alter dataflow, channel and servo settings in an attempt to improve the signal processing output and successful ECC decode of the data. Data buffer repair or reconstruction strategies can also be used to improve correction recovery (e.g., iterative decode and buffer data cut/paste, as will be further discussed).

However, read interchange of data formats with varying track pitch that were written by different size head elements and subsequently being read on a drive with smaller head elements presents new challenges. This combined with media wear and damage can compromise servo track following and lead to poor signal resolution. A bad writing drive can also create a cartridge which is not easily readable by other tape drives of its own generation or of newer generations. In a library configuration where a given cartridge often has data written by multiple tape drives, a bad writing drive creates local areas of excessive read recovery or permanent read error.

Track placement accuracy is achieved by positioning of the servo readers relative to the data writers. Two active servo channels monitor read back signals from the timing-based servo pattern pre-formatted on tape to determine tape/head position and relative skew angles. This accurately positions the data channels to the correct wrap for processing data. However, tape distortion and marginal writing drive characteristics can alter the optimum track position. Therefore, microcode will use head-position offset methods in the course of recovery. A positive or negative value may be added to the position offset that servo control would normally choose. Depending on the scenario, this technique may be sufficient to successfully reread data from tape by itself or in combination with initiated microcode recovery strategies. There are unusual cases, however, when this model of offset recovery, in combination with other recovery methods, is insufficient.

The present invention contemplates a long-duration strategy to identify and manage data written by a bad or marginal writing drive, or to manage data in areas of tape stiction, debris, or tape damage responsible for errors over a long section of tape. These cases can cause localized read signal loss of multiple tracks (or channels) within the set of n-channels simultaneously recorded with ECC encoding. The nominal recovery strategy is to maintain a reserved buffer copy of the dataset which is iteratively repaired by copying improvements in ECC correction achieved with each reread of the failing dataset from tape, as described in detail in U.S. patent application Ser. Nos. 14/987,921 and 14/987,950.

A subset of the retries used for the cut/paste repair strategy (described in the aforementioned U.S. Patent Applications and summarized below) involve the application of read offsets that are nominally within the allowed margins of the track pitch (or width) and that are oriented closer to the centerline than to the outside edges of the track. When signal loss consistently affects multiple tracks within a localized area of tape, this can require use of offsets which are beyond the nominal offset margins used by the reading drive. In these cases, use of the nominal range of offsets is deferred in favor of a higher range of offsets which position the read head closer to the track edges and potentially beyond. This tactic alone cannot always successfully read the dataset, but can provide better ECC correction for input to the cut/paste algorithms used for iterative correction. Two or more offset ranges are defined for use in read recovery based on the severity of channel dropout and/or an error signature that associates successful use of high offsets with a particular writing drive. Hence, the offset table described herein is a mechanism providing such functionality as selecting and applying a variable range of offsets based on real-time channel signal performance feedback. Once a range of offsets is selected, a track following servo mechanism of the tape storage drive will position a read head in both a positive/negative relation around a track centerline up to the maximum allowed offset margin of the selected range. This offset can be confined within area of expected track placement on the tape media or may approach or extend beyond the expected track pitch (or track width), as will be further described.

Turning now to the Figures, and in particular to FIG. 1A, there is depicted a block diagram of client-server library system 100 for archiving data in which aspects of the present invention may be implemented. The system 100 includes multiple client computers 111 from which data is transmitted to a server 112 for archiving in a data storage library 113. The client computers 111 also retrieve previously archived data from the library 113 through the server 112. Client computers 111 may be personal computers, portable devices (e.g., PDAs), workstations, or server systems, such as the IBM TS7720™. The client computers 111 may be connected to the server 112 through a local area network such as an Ethernet network, or by SCSI, iSCSI, Fibre Channel, Fibre Channel over Ethernet, or Infiniband. Server 112 may again be an IBM TS7740™ server, TS7720™ server, or other servers. Similarly, the data storage library 113 may be connected to the server 112 using a high data rate connection such as an optical or copper fiber channel, SCSI, iSCSI, Ethernet, Fibre Channel over Ethernet or Infiniband.

Figure 1B:
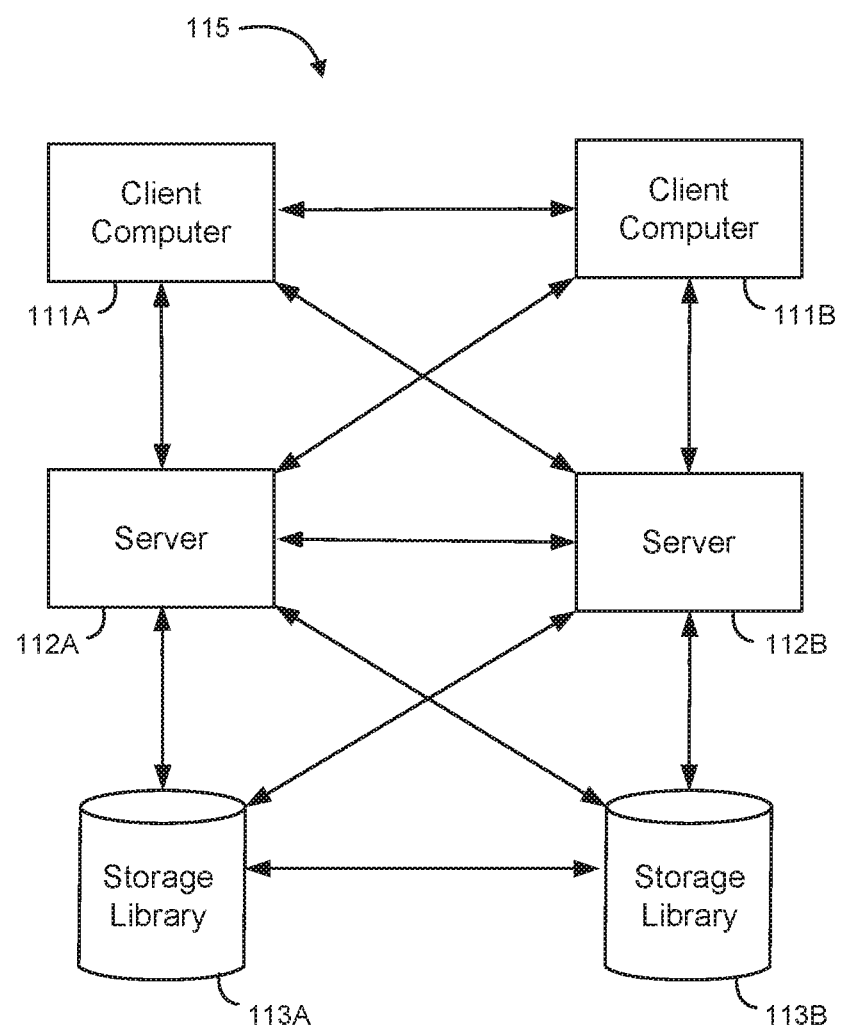
FIG. 1B is a block diagram illustrating a typical grid computing client-server library environment for archiving data, in which aspects of the invention can be implemented.

FIG. 1B illustrates a block diagram of a typical grid computing library environment 115 for archiving data. The library environment 115 includes multiple client computers 111A and 111B interconnected to one another and to multiple server systems 112A and 112B. The server systems 112A and 112B are interconnected to one another and to multiple storage libraries 113A and 113B, which are also interconnected to one another.

Figure 2:
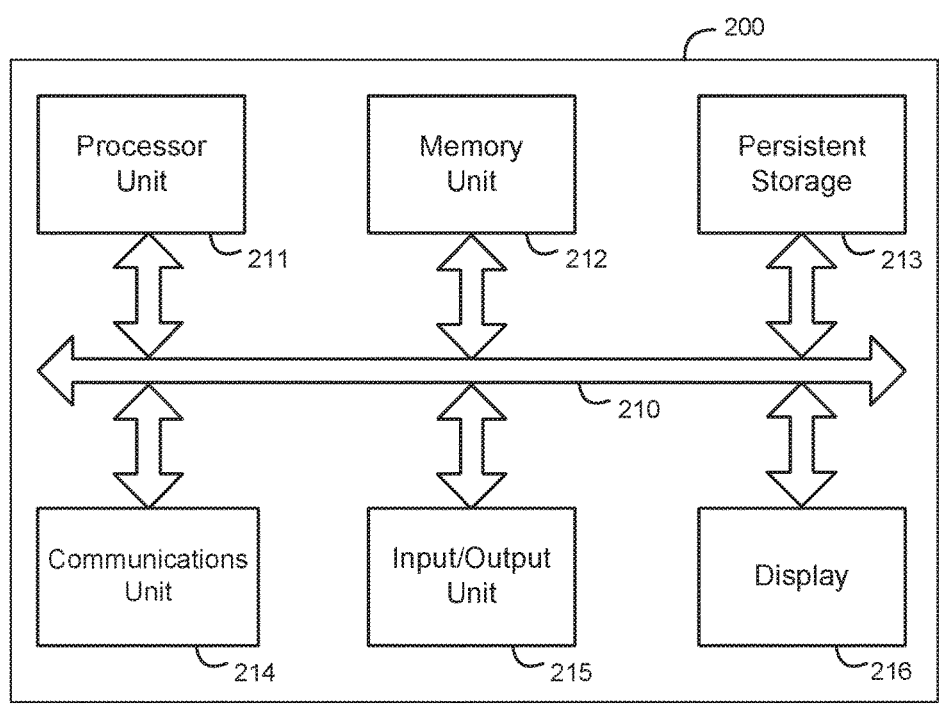
FIG. 2 is a block diagram illustrating a representative computer system which may be used as a client or a server computer.

FIG. 2 illustrates a block diagram of a data processing system that may be used as a client computer 111 or server system 112. As shown, a data processing system 200 includes a processor unit 211, a memory unit 212, a persistent storage 213, a communications unit 214, an input/output unit 215, a display 216 and a system bus 210. Computer programs are typically stored in the persistent storage 213 until they are needed for execution, at which time the programs are brought into the memory unit 212 so that they can be directly accessed by the processor unit 211. The processor unit 211 selects a part of memory unit 212 to read and/or write by using an address that the processor 211 gives to memory 212 along with a request to read and/or write. Usually, the reading and interpretation of an encoded instruction at an address causes the processor 211 to fetch a subsequent instruction, either at a subsequent address or some other address. The processor unit 211, memory unit 212, persistent storage 213, communications unit 214, input/output unit 215, and display 216 interface with each other through the system bus 210.

Figure 3:
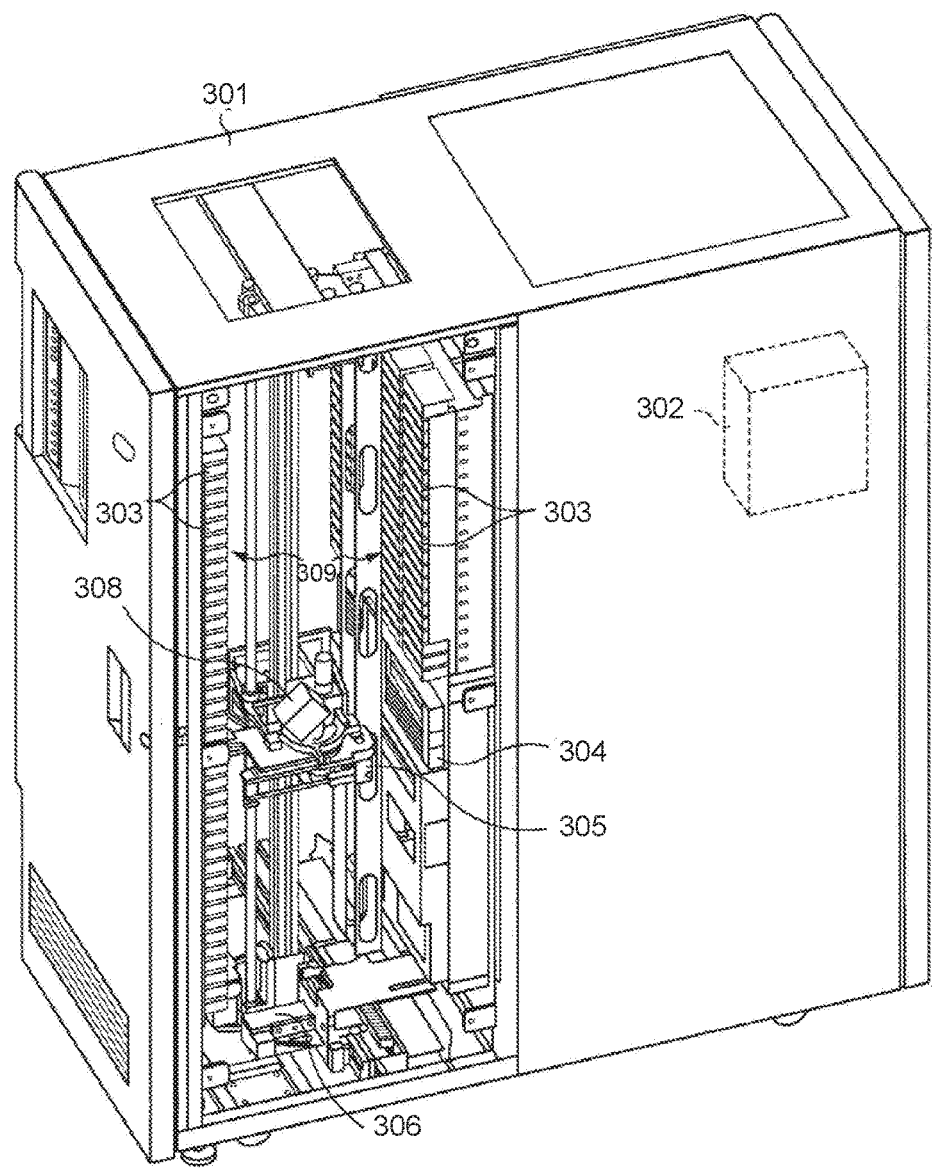
FIG. 3 illustrates a typical data storage tape library for archiving data, in which aspects of the present invention may be implemented upon.

FIG. 3 illustrates an example of a data storage library 301 which may be found in an environment of an implementation of the present invention. The library 301 is an automated tape library that accommodates multiple tape drives 304 for reading and writing on tape media, such as single-reel or two-reel magnetic tape cartridges. Examples of the library 301 include IBM TS3400™ and TS3500™ Tape Libraries, IBM TotalStorage™ 3494 Tape Libraries, and IBM 3952™ Tape Frames Model C20, which store magnetic tape cartridges and use IBM TS1130™ tape drives. Other examples of the library 301 include IBM TS3310™ and TS3100/3200™ tape libraries which store magnetic tape cartridges and use IBM LTO (Linear Tape Open) tape drives. A plurality of tape media 303 are stored in banks or groups of storage slots 309. Tape media may encompass a variety of media, such as that contained in magnetic tape cartridges, magnetic tape cassettes, and optical tape cartridges, in various formats. For universal reference to any of these types of media, the terms "tape media" or "media" are used herein, and any of these types of containers are referred to as "tape cartridges" or "cartridges" herein. An access robot 306, including a cartridge picker 305 and a bar code reader 308 mounted on the picker, transports a selected cartridge 303 between a storage slot 309 and a drive 304.

The library 301 further has a library controller 302 which includes at least one microprocessor. The library controller 302 may serve to provide an inventory of the cartridges 303 and to control the library 301. Typically, the library controller 302 has suitable memory and data storage capability to control the operation of the library 301. The library controller 302 controls the actions of the access robot 306, cartridge picker 305, and bar code reader 308. The library controller 302 is interconnected through an interface to one or more host processors, which provides commands requesting access to particular tape media or to media in particular storage slots. A host, either directly, or through the library controller, controls the actions of the data storage drives 304. Commands for accessing data or locations on the tape media and information to be recorded on, or to be read from, selected tape media are transmitted between the drives 304 and the host. The library controller 302 is typically provided with a database for locating the tape cartridges 303 in the appropriate storage slots 309 and for maintaining the cartridge inventory.

Figure 4:
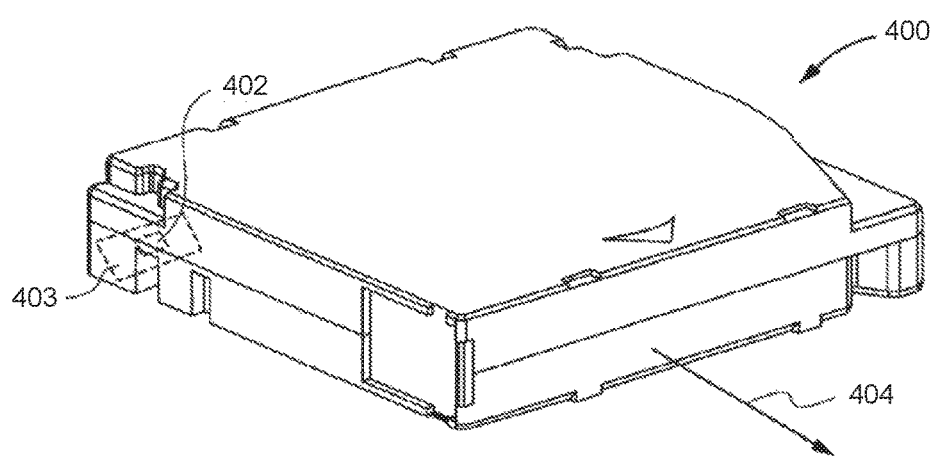
FIG. 4 illustrates an example of a tape cartridge media for use in the data storage tape library in FIG. 3.

FIG. 4 illustrates a perspective view of an exemplary tape cartridge 400 for use in a tape drive system 304 of FIG. 3, and fundamental to the present invention. The tape cartridge 400 has a reel (not shown) for holding tape media (not shown) which is wound around the reel hub. The tape cartridge 400 further includes an RFID cartridge memory 402 which is on printed circuit board 403, for wireless interfacing with the tape drive 304 and the cartridge picker 305. The tape cartridge 400 is referred to as a single-reel cartridge as it includes only one tape reel which acts as a supply reel during operation. A take-up reel is provided in the tape drive 304 for receiving the tape media when the tape media is being unspooled from the tape reel. In a different design of the tape drive 304, a take-up reel might be included in the cartridge 400 itself rather than in the tape drive 304. Such a tape cartridge is referred to as a dual-reel cartridge. Cartridge 400 is inserted along direction 404 into tape drive 304.

Figure 5:
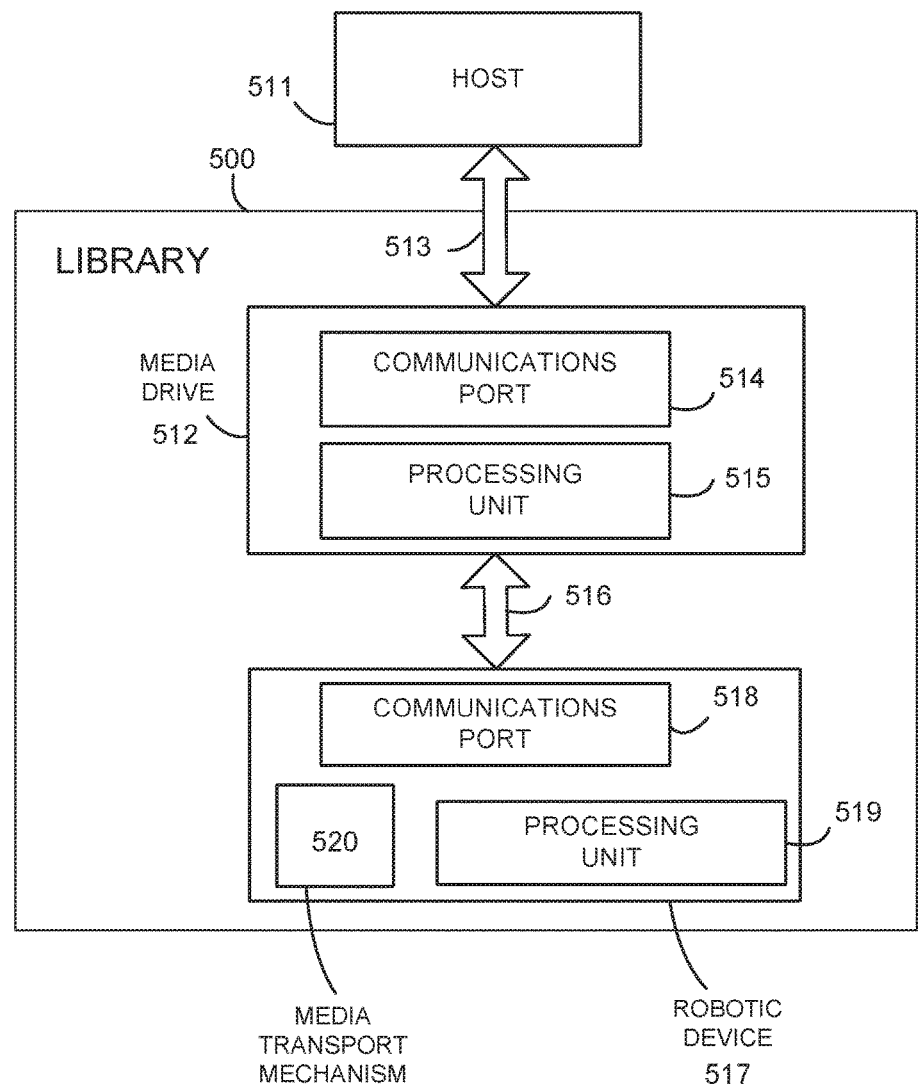
FIG. 5 illustrates a block diagram showing an exemplary data storage tape library in communication with a host computer for providing aspects of the invention.

FIG. 5 is a block diagram showing the functional components of an exemplary data storage tape library 500 in communication with a host computer 511 for providing aspects of the invention. The library 500 is attached to a host 511, and includes a media drive 512 and a robotic device 517. Data and control path 513 interconnects the host 511 and drive 512. Similarly, data and control path 516 interconnects the drive 512 and the robotic device 517. The paths 513 and 516 may comprise suitable means for conveying signals, such as a bus with one or more conductive members (such as wires, conductive traces, cables, etc.), wireless communications (such as radio frequency or other electromagnetic signals, infrared communications, etc.), and fiber optic communications. Furthermore, the paths 513 and 516 may employ serial, parallel, or another communications format, using digital or analog signals as desired. Communications with the media drive 512 and robotic device 517 are through communications ports 514 and 518, respectively.

Both the drive 512 and the robotic device 517 include respective processing units 515 and 519. The library 500 manages the positioning and access of removable or portable data storage media such as magnetic tape, cartridge 400, optical tape, optical disk, removable magnetic disk drive, CD-ROM, digital video disk (DVD), flash memory, or another appropriate format. Some of these types of storage media may be self-contained within a portable container, or cartridge. For universal reference to any of these types of storage media, this disclosure refers to them as media.

The host 511 may be a server, workstation, personal computer, or other means for exchanging data and control signals with the media drive 512. The drive 512 comprises a machine for reading data from and/or writing data to exchanging data with a portable data storage media. The robotic device 517 includes the processing unit 519 and a media transport mechanism 520 coupled to processing unit 519. The media transport mechanism 520 includes servos, motors, arms, grippers, sensors and other robotic, mechanical and electrical equipment to perform functions that include (at least) the transportation of media items between the drive 512, various storage bins (not shown), import/export slots, etc. The mechanism 520 may, for example, comprise an auto-loader mounted to the drive 512, a robotic arm housed inside a mass storage library, or another suitable device. As an example, the mechanism 520 may comprise an access robot 306, cartridge picker 305 and bar code reader 308 from FIG. 3.

Figure 6:
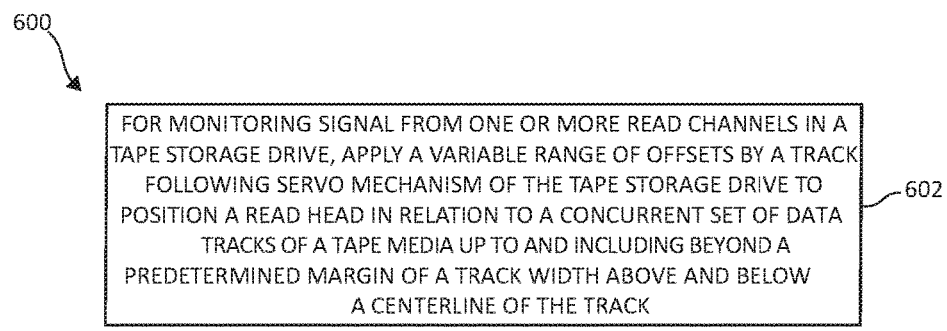
FIG. 6 illustrates a flowchart of a method for error recovery in a data storage environment, according to aspects of the present invention.

Continuing to FIG. 6, a flowchart diagram illustrating an exemplary method 600 for error recovery in a data storage environment, among other aspects of the illustrated embodiments, is depicted. As aforementioned the method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

The method 600 begins by, for monitoring signal from one or more read channels in a tape storage drive, selecting by microcode and applying a variable range of offsets within an offset table by a track following servo mechanism of the tape storage drive to position a read head in relation to a track of a tape media at an offset up to and including beyond a predetermined margin of the track/track width above and below a centerline of the track (step 602). The method 600 ends.

Figure 7:
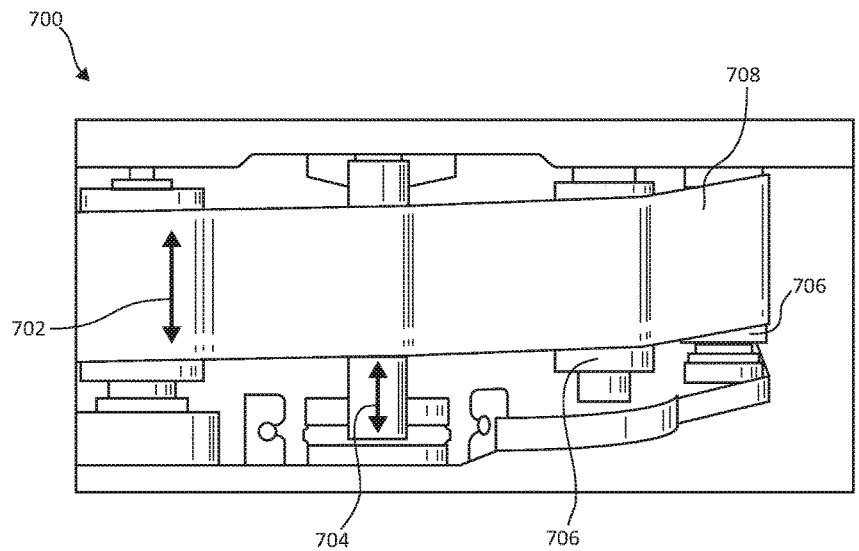
FIG. 7 illustrates a block diagram of a tape path as positioned in the data storage tape library in FIG. 3, according to aspects of the present invention.

FIG. 7 illustrates a block diagram of a tape path 700 showing tape as pulled out of the tape cartridge 400 across the rollers 706 and so positioned across the recording head 704 of the tape drive 304. Vertical head positioning by the servo achieves correct track placement by moving the ½ inch tape 708 across the rollers 706 such that the lateral tape motion 702 positions the tape 708 over the head 704 at the correct position to read the track.

Figure 8:
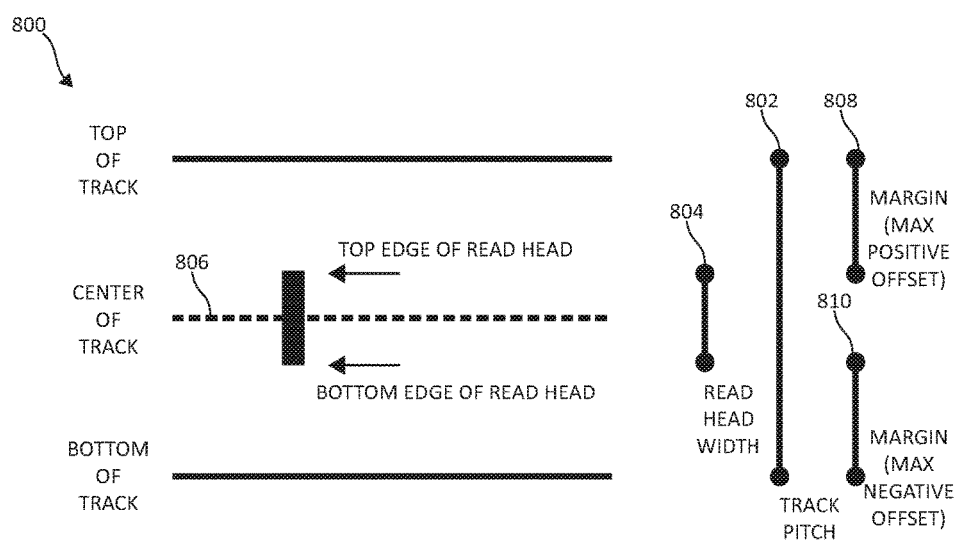
FIG. 8 illustrates a block diagram of a track of the tape cartridge media in FIG. 4, according to aspects of the present invention.

FIG. 8 illustrates block diagram of a track 800 stored on the tape 708 of the tape cartridge 400. As aforementioned, each data format has its own track pitch (or width) 802, and each drive generation has a different read head width 804.

On cartridge load, the format of the tape is recognized and operating ranges identified. For effective reading, the read head is nominally positioned at the center of the track 806. The distance between the read head edge and track edge is called the "margin". Each data format and generation type has an allowed maximum margin of which either a positive offset 808 or negative offset 810 may be set. When microcode requests an offset variation, it specifies a value or range of values within this margin.

FIG. 9 illustrates a table diagram of these data formats and allowed offset margins. Table 900 shows track layouts by data formats within certain tape cartridges 400 (e.g., J5A-JD 15 TB cartridge, J5-JD 10 TB cartridge, etc.). As seen illustrated, each successive cartridge format, while having more capacity to store data, has a decreasing track pitch 802, and an increasing amount of data tracks and wraps. The principle shown here is the increasing density of the data stored commensurate with the tracks of the data format. Table 950 then illustrates allowed, or supported offset margins by drive type. These supported margins are calculated as Margin=(TrackPitch-ReaderWidth)/2. Hence, as the track pitch 802 decreases by data format type in table 900, and the read head width 804 decreases by drive type (e.g., IBM® TS1155™ drive), so does the allowed margin of such data format attendant with the drive type.

Microcode recovery can use a range of servo offsets within these margins to assist in recovering data. On successful recovery, an offset can be discarded or made persistent depending on the scenario. If persistence is desired, then normally the successful servo offset will be maintained until the next read error.

There are unusual cases, however, when this model of offset recovery is insufficient. As aforementioned, the mechanisms of the present invention provide a long-duration strategy to manage data written by a bad or marginal writing drive, or to manage data in areas of tape stiction, debris or tape damage responsible for errors over a long section of tape. Read signal dropout across multiple channels and across a localized area can result from these conditions. In combination with cut/paste recovery, these cases may require use of offsets which are beyond the allowed offset margins illustrated in table 950. This is problematic, since error recovery is time-limited with only a portion of this time devoted to offset methods. Failure analysis of unreadable or high-temp rate cartridges from the field has revealed that in some cases, higher than normal offsets were most effective in recovering the data with poor read signal on multiple channels. Criteria was definable that allowed creation and use of a variable offset range table, as seen in FIG. 10.

FIG. 10 is a table diagram 1000 of variable offset ranges. Table 1000 illustrates a default row of servo offsets, and one or more additional rows composed of different offset ranges, namely a nominal range, a high range, and an offtrack write range. Some of these additional rows (i.e., the high range and offtrack write range row) have offset values that exceed the allowed margin and may have restricted use. For example, the offtrack write offset range is for out of specification track placement and only used for unique and rare customer data recovery cases. Each row has 5 offset values to be applied during the offset phase of recovery, and only one offset range as defined by a row in the variable offset range table is selected for use in a given recovery session. Each of the nominal range, high range, and offtrack write range include a default offset (as applied as a +/−offset change as percentage of the margin) of 0%. The percentage then is applied as follows. In the nominal range, the offset change is applied at 40%, 55%, 70%, and 85%, respectively.

The high range, after the default percentage of 0, is applied at 90%, 105%, 110%, and 135%, respectively. The offtrack write range, after the default percentage of 0, is applied at 70%, 150%, 270%, and 280%, respectively. These offset values are applied in sequence, first as a positive offset and then as a negative offset. If selected and if successful, use of these additional offset table rows follow different servo offset persistence rules. Each row of ranges, as defined, indicate the offset selection for an increasing severity or degradation in read performance. It is important to note that these ranges are provided only as examples for the purposes of illustrating the functionality of the present invention. Any number of additional offset ranges may be definable based on discovered criterion and drive generational differences pertaining to tape recording head size.

Figure 11A:
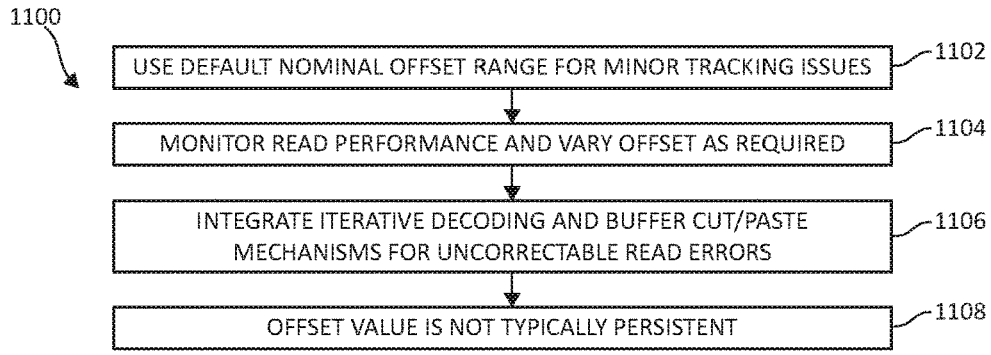
FIGS. 11A-C illustrate additional flowcharts of methods for error recovery in a data storage environment, according to aspects of the present invention.
Figure 11B:
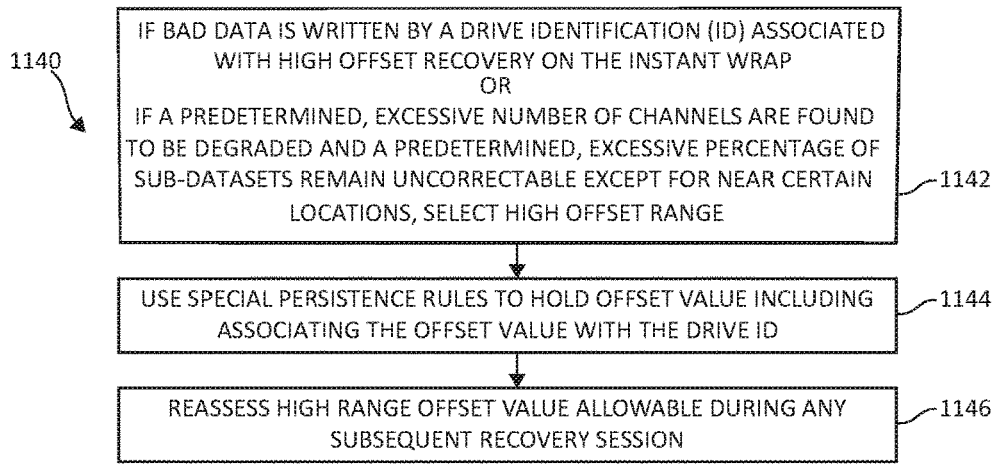
Figure 11C:
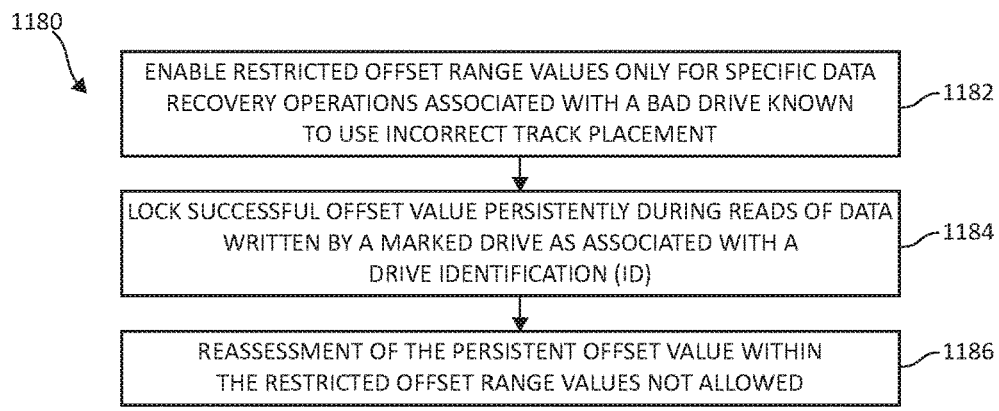

FIGS. 11A-C illustrate additional flowcharts of methods 1100, 1140, and 1180 for error recovery in a data storage environment. As aforementioned the methods 1100, 1140, and 1180 may be performed in accordance with the present invention in any of the environments depicted in FIGS. 1-5, among others, in various embodiments. Of course, more or less operations than those specifically described in FIGS. 11A-C may be included in the methods 1100, 1140, and 1180, as would be understood by one of skill in the art upon reading the present descriptions.

Each of the steps of the methods 1100, 1140, and 1180 may be performed by any suitable component of the operating environment. For example, in various embodiments, the methods 1100, 1140, and 1180 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the methods 1100, 1140, and 1180. Illustrative processors include, but are not limited to, a central processing unit (CPU), an application specific integrated circuit (ASIC), a field programmable gate array (FPGA), etc., combinations thereof, or any other suitable computing device known in the art.

Nominal Range

FIG. 11A illustrates a flowchart of the method 1100, pertaining to the nominal range of the variable ranges of applied offsets. For most read recovery, offsets within the nominal range are used as the default selection of variable range offsets (step 1102). The nominal range is sufficient for minor tracking issues, and as read performance is monitored, the offset is varied as required to achieve correction (step 1104). The nominal range additionally integrates buffer repair strategies such as iterative decode and cut/paste (step 1106).

Iterative decoding enables a dataflow to perform multiple C2-C1 decode iterations over a dataset already resident in a data buffer. In this way, no reread of data is required to improve dataset decode results. Microcode iterative decode cycles may be performed while tape 708 is at speed (the drive is still in motion) or performed once motion has stopped and the drive has repositioned back to the dataset in error. Each microcode iterative decode cycle builds on the correction improvement of a previous cycle. Either the dataset in the buffer becomes correctable or a correction status converges to a "no improvement" state and/or exceeds a predetermined error correction threshold limit. If still uncorrectable, microcode recovery algorithms may proceed to initiate a cut/paste algorithm and/or reread data from tape 708.

This repeated, or iterative, decode may be performed by dataflow logic a limited number of times while tape 708 is moving before data buffer throughput and host performance are affected. Once beyond such a threshold, tape motion must stop and a dataset will enter into data recovery under microcode control. For example, n number of microcode iterative decode cycles may be initiated before stopping the tape 708 due to buffering. Following a backhitch, further iterative decode action by microcode may continue in order to improve dataset correction as much as feasible. For example, x number of microcode iterative decode cycles may be initiated while the tape is stopped, until it is determined there is no longer any correction improvement, and/or a predetermined error correction threshold is reached. Microcode iterative decode operates on a dataset image that is stored in dynamic random access memory (DRAM), so no reread is involved. If the dataset is able to be corrected with further invocations of iterative decode by microcode, it significantly reduces head wear and possible tape damage involved with multiple backhitches required to reread data from tape 708.

A microcode cut/paste error recovery algorithm may then leverage the iterative decode's "best" corrected dataset following application of offset within selected range to more effectively improve microcode's working copy of the dataset. The two methods work in tandem to lessen recovery time, lessen performance impacts by using iterative decode while tape 708 is still in motion, and reduce the head and media wear associated with repeated backhitch for dataset reread from tape 708. As much as possible, the cut/paste error recovery is run in multi-cut/paste mode such that the error dataset as well as the n-datasets which follow that datasets are read prior to backhitch and stop. Iterative decode is only invoked on the lead dataset, however cut/paste buffer repair may be performed on all datasets. This reduces excessive start/stop over one dataset over the course of recovery to reduce the risk of tape damage.

The microcode cut/paste algorithm uses a divided data buffer, organized as a ring buffer. One dataset is associated with one buffer segment. Data is read from tape 708 into normal buffer segments. When an uncorrectable read dataset is detected, microcode will make a copy of it to a reserved buffer segment. In legacy drives, microcode will compare the newly read dataset to the reserved copy and make C1 repairs to each sub-dataset of the reserved copy. Once correctable, the cut/paste segment is copied back to the normal segment and recovery terminates successfully. Legacy cut/paste recovery is dependent on improved quality and error rate as a result of rereading data using different dataflow, servo, speed, and channel settings.

In the case of read interchange, varying the servo offset can move a small read head (i.e., head 704) around within a larger track pitch to a position which might improve the read signal on one or more channels. This improvement may or may not be able to successfully read the dataset from media on its own, but following iterative decode mechanisms as discussed may be used to successfully repair the dataset copy as part of an aggregated number of retries using different settings, as aforementioned. Using offsets within the nominal range pertains to more of a recovery strategy and successful offset values therein are not always a value to be made persistent (step 1108) unless a pattern of repeated application develops. Persistence in this case is not associated with a writing drive identification (ID).

High Range

FIG. 11B illustrates a flowchart of the method 1140, pertaining to the high range of the variable ranges of applied offsets. In cases involving a marginal writing drive, local debris, tape damage, or distortion, recovery is inherently more difficult and the nominal offset range not always effective. The read signal from one or more channels can degrade (or fade) in localized areas even though the read channel is otherwise good. A dataset is divided into n-ECC correctable sub-datasets. In the case of a 32-channel drive, if a predetermined number (e.g., four or more) channels are degraded and more than a predetermined percentage (e.g., 75%) of the sub-datasets are uncorrectable, offsets within the high range of the variable range offsets are selected (step 1142). The high range will also be selected if the drive ID of the writing drive has been associated with high offset recovery on a current or instant wrap, however certain locations on tape such as wrapturn at end of tape must avoid the use of high offsets.

Since the high offset range begins at 90% of the offset margin and can well exceed the offset margin, any recovery using the high range offset table row is deemed significant. Regardless of which offset range row is used, the goal is to resolve the read error and to reduce the need for further error recovery in the area by normally holding hardware modifications persistent until the next error. In the usual case, the next error recovery session may then drop an offset and then possibly rediscover it. Rediscovery of a correcting offset is not always assured, however, especially in areas with many datasets needing recovery in close proximity. Hence, if a dataset recovers using an offset within the high range of variable range offsets, then special persistence rules apply. These special persistence rules include noting the writing drive ID of the dataset by microcode. Subsequently, as long as data written from that drive ID continues to be read on the wrap, the high offset will be held active, which reduces backhitching (step 1144). Therefore, a marked drive ID may not require high offsets for the full length of the wrap, but only in localized areas. Reassessment of the high range offset value, however, is allowed during any subsequent recovery session (1146). The required offset may differ by tape direction.

Offtrack Write Range

FIG. 11C illustrates a flowchart of the method 1180, pertaining to the offtrack write range of the variable ranges of applied offsets. The offset write range row of the variable offset range table is a restricted-use row enabled only for customer data recovery since especially high offset values are specified (step 1182). This recovery scenario is limited to data written by a known bad drive known to write tracks with incorrect placement. On a tape cartridge 400 where the bad drive has appended, the symptom is an apparent void at the append point. Yet, subsequent application of an offset within the offtrack write row values is able to read the data. Since offsets within the offtrack write offset table row are not nominal, the successful offset value is to be locked in as a persistent setting as long as data written by the marked drive ID is being read (step 1184). Although the offset able to retrieve the data may differ by direction, no re-assessment of the persistent offset is allowed during a subsequent recovery session since it is considered a baseline defect associated with writing drive ID (step 1186). As a restricted-use row, the microcode must be configured to use offsets within the offtrack write range of variable range offsets by enabling a data structure containing a serial number (S/N) of the known bad drive.

Figure 12A:
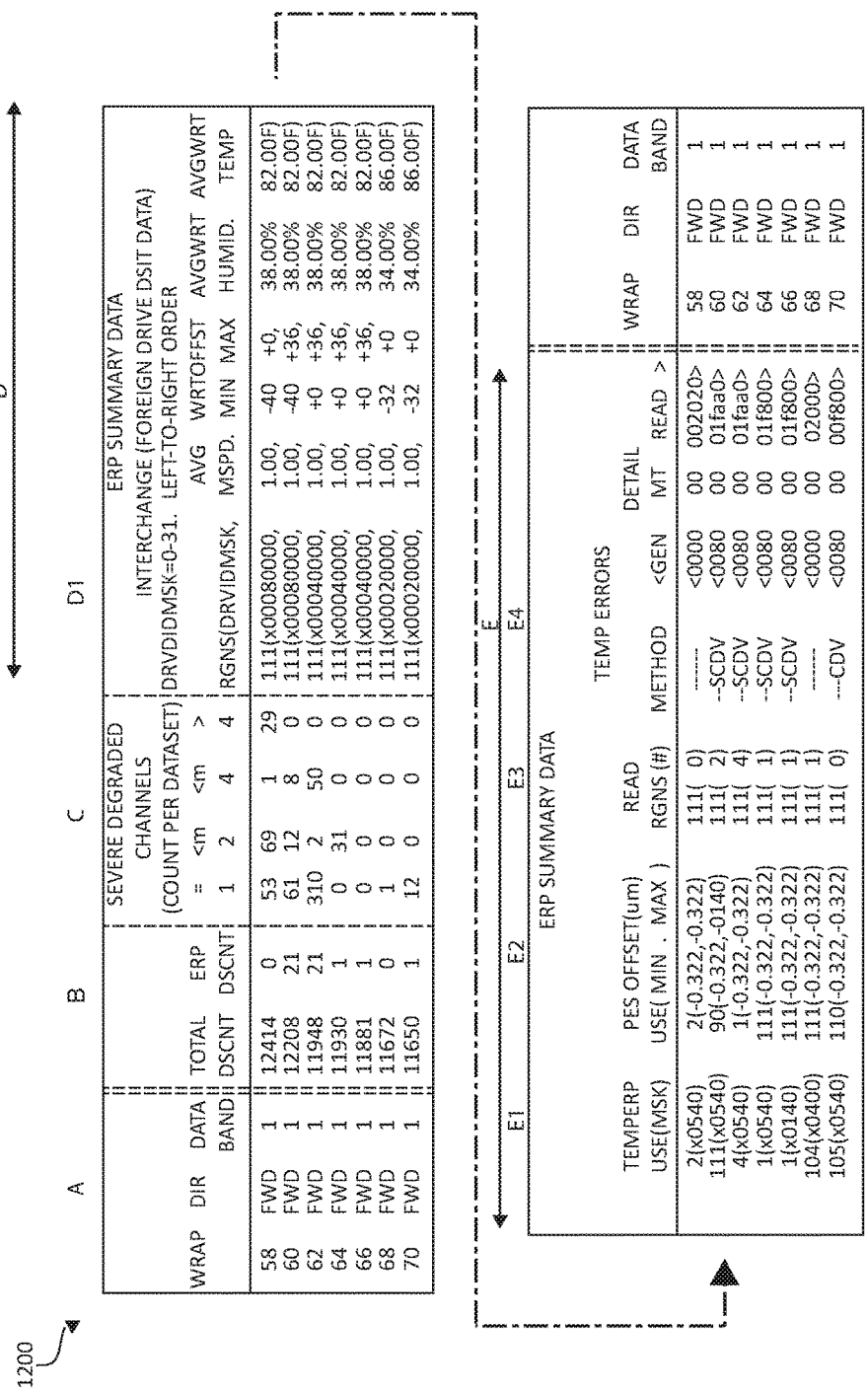

FIGS. 12A-B illustrate a table diagram of a tape map and drive statistics 1200, and bit-mask drive ID key 1250, respectively. The tape map 1200 is an example of how use of the high range of variable range offsets allowed an IBM® TS1150™ drive to successfully read an unreadable JD cartridge. Tape map 1200 is a wrap summary, organized by data bands, where each wrap is logged by region (having equal sections of tape from beginning to end, 111 total). Note that the illustration is an incomplete picture as only two data bands with forward direction wraps are shown (column A). Temporary (recovered) errors were only experienced on the middle wraps of data band 1 (see boxed area of wraps 58-70, and column B where the number of datasets processed and ERP datasets are tallied). Data band 1 is the only area where severe channel degradation is detected (column C). A high offset of −0.322 um (90%, with servo scaling) was required to read these wraps (column E2). Columns E1 and E4 give further (encoded) information about what other hardware changes were needed and which changes were held persistent.

The D columns of the tape map 1200 summarize statistics of the writing drive. Column D1 is a bit-mask of which drive IDs were involved in writing the wrap. The tape map 1200 tracks a maximum of 32 writing drives per cartridge. The drive ID bit-mask is associated with a drive serial number, as shown in FIG. 12B. Note that in the highlighted box (wraps 58-70) of the tape map 1200, the drive ID most associated with the −0.322 um offset is x000400000. The left-most bit of this mask is drive ID 0 (the mounted drive). Using the bit-mask drive ID key 1250 of FIG. 12B, it can be seen that x000400000 corresponds to drive ID 09 which is the IBM® TS1150™ drive having a S/N of E78D84AF. Since this drive ID does not appear in other data bands of the tape map 1200, this drive is assumed suspicious and warrants further drive failure analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for error recovery in a data storage environment, by a processor device, comprising:

for monitoring signal degradation from one or more read channels in a tape storage drive, selecting and applying a variable range of offsets from an offset table by a track following servo mechanism of the tape storage drive to position a read head in relation to a track of a tape media at an offset up to and including beyond a predetermined margin of the track; wherein the variable range of offsets includes a plurality of offset values organized by row in the offset table, the plurality of offset values defined in at least a nominal range, a high range, and an offtrack write range; and selecting and applying in sequence each one of the plurality of offset values in one of the nominal range, the high range, and the offtrack write range first as a positive offset and subsequently a negative offset when reading a dataset of the tape media.

2. The method of claim 1, further including, when using the nominal range, performing at least one of:

initializing at least one iterative decode cycle on the dataset read from the tape media, each iterative decode cycle providing an error feedback loop; and incorporating results of the at least one iterative decode cycle with a microcode cut/paste algorithm on the dataset; wherein a most corrected dataset recovered by the at least one iterative decode cycle is cut and pasted over a dataset copy resident in a reserved buffer segment.

3. The method of claim 1, further including selecting the high range of the variable range offsets when one of:
- the signal of at least a predetermined number of the one or more read channels is detected to be degraded and at least a predetermined percentage of sub-datasets of the dataset remain uncorrectable; or
- a writing drive of the dataset being read has been marked on a current wrap as requiring one of the plurality of offset values defined in the high range, except in certain predetermined areas of the current wrap.

4. The method of claim 3, further including, upon correctly reading the dataset using the high range of the variable range offsets, performing each of:
- detecting and noting a drive identification (ID) of a writing drive of the dataset; and
- holding one of the plurality of offset values of the high range persistent while reading any data on the current wrap written by the writing drive as associated with the drive ID.

5. The method of claim 4, further including using the offtrack write range of the variable range offsets only for specialized data recovery operations written from a known problematic drive as associated with the drive ID; wherein the offtrack write range is configured in microcode by enabling a data structure containing a serial number of the known problematic drive.

6. The method of claim 5, further including holding one of the plurality of offset values of the offtrack write range persistent while reading any data written by the known problematic drive as associated with the drive ID for all wraps of a current mount.

7. The method of claim 3, further including allowing reassessment of the plurality of offset values while using the high range during a subsequent recovery session on the current wrap; and
- disallowing reassessment of the plurality of offset values while using the offtrack write range during the subsequent recovery session.

8. A system for error recovery in a data storage environment, the system comprising:
- a processor device executing instructions stored in a memory, wherein the processor device:
  - for monitoring signal degradation from one or more read channels in a tape storage drive, selects and applies a variable range of offsets from an offset table by a track following servo mechanism of the tape storage drive to position a read head in relation to a track of a tape media at an offset up to and including beyond a predetermined margin of the track; wherein the variable range of offsets includes a plurality of offset values organized by row in the offset table, the plurality of offset values defined in at least a nominal range, a high range, and an offtrack write range; and
  - selects and applies in sequence each one of the plurality of offset values in one of the nominal range, the high range, and the offtrack write range first as a positive offset and subsequently a negative offset when reading a dataset of the tape media.

9. The system of claim 8, wherein the processor device, when using the nominal range, performs at least one of:
- initializing at least one iterative decode cycle on the dataset read from the tape media, each iterative decode cycle providing an error feedback loop; and
- incorporating results of the at least one iterative decode cycle with a microcode cut/paste algorithm on the dataset; wherein a most corrected dataset recovered by the at least one iterative decode cycle is cut and pasted over a dataset copy resident in a reserved buffer segment.

10. The system of claim 8, wherein the processor device selects the high range of the variable range offsets when one of:
- the signal of at least a predetermined number of the one or more read channels is detected to be degraded and at least a predetermined percentage of sub-datasets of the dataset remain uncorrectable; or
- a writing drive of the dataset being read has been marked on a current wrap as requiring one of the plurality of offset values defined in the high range, except in certain predetermined areas of the current wrap.

11. The system of claim 10, wherein the processor device, upon correctly reading the dataset using the high range of the variable range offsets, performs each of:
- detecting and noting a drive identification (ID) of a writing drive of the dataset; and
- holding one of the plurality of offset values of the high range persistent while reading any data on the current wrap written by the writing drive as associated with the drive ID.

12. The system of claim 11, wherein the processor device uses the offtrack write range of the variable range offsets only for specialized data recovery operations written from a known problematic drive as associated with the drive ID; wherein the offtrack write range is configured in microcode by enabling a data structure containing a serial number of the known problematic drive.

13. The system of claim 12, wherein the processor device holds one of the plurality of offset values of the offtrack write range persistent while reading any data written by the known problematic drive as associated with the drive ID for all wraps of a current mount.

14. The system of claim 10, wherein the processor device allows reassessment of the plurality of offset values while using the high range during a subsequent recovery session on the current wrap; and
- disallows reassessment of the plurality of offset values while using the offtrack write range during the subsequent recovery session.

15. A computer program product for error recovery in a data storage environment, by a processor device, the computer program product embodied on a non-transitory computer-readable storage medium having computer-readable program code portions stored therein, the computer-readable program code portions comprising:
- an executable portion that, for monitoring signal degradation from one or more read channels in a tape storage drive, selects and applies a variable range of offsets from an offset table by a track following servo mechanism of the tape storage drive to position a read head in relation to a track of a tape media at an offset up to and including beyond a predetermined margin of the track; wherein the variable range of offsets includes a plurality of offset values organized by row in the offset table, the plurality of offset values defined in at least a nominal range, a high range, and an offtrack write range; and
- an executable portion that selects and applies in sequence each one of the plurality of offset values in one of the nominal range, the high range, and the offtrack write range first as a positive offset and subsequently a negative offset when reading a dataset of the tape media.

16. The computer program product of claim 15, further including an executable portion that, when using the nominal range, performs at least one of:
  initializing at least one iterative decode cycle on the dataset read from the tape media, each iterative decode cycle providing an error feedback loop; and
  incorporating results of the at least one iterative decode cycle with a microcode cut/paste algorithm on the dataset; wherein a most corrected dataset recovered by the at least one iterative decode cycle is cut and pasted over a dataset copy resident in a reserved buffer segment.

17. The computer program product of claim 15, further including an executable portion that selects the high range of the variable range offsets when one of:
  the signal of at least a predetermined number of the one or more read channels is detected to be degraded and at least a predetermined percentage of sub-datasets of the dataset remain uncorrectable; or
  a writing drive of the dataset being read has been marked on a current wrap as requiring one of the plurality of offset values defined in the high range, except in certain predetermined areas of the current wrap.

18. The computer program product of claim 17, further including an executable portion that, upon correctly reading the dataset using the high range of the variable range offsets, performs each of:
  detecting and noting a drive identification (ID) of a writing drive of the dataset; and
  holding one of the plurality of offset values of the high range persistent while reading any data on the current wrap written by the writing drive as associated with the drive ID.

19. The computer program product of claim 18, further including an executable portion that uses the offtrack write range of the variable range offsets only for specialized data recovery operations written from a known problematic drive as associated with the drive ID; wherein the offtrack write range is configured in microcode by enabling a data structure containing a serial number of the known problematic drive.

20. The computer program product of claim 19, further including an executable portion that holds one of the plurality of offset values of the offtrack write range persistent while reading any data written by the known problematic drive as associated with the drive ID for all wraps of a current mount.

21. The computer program product of claim 17, further including an executable portion that allows reassessment of the plurality of offset values while using the high range during a subsequent recovery session on the current wrap; and
  disallows reassessment of the plurality of offset values while using the offtrack write range during the subsequent recovery session.

* * * * *